(12) United States Patent
Ok et al.

(10) Patent No.: US 9,884,474 B2
(45) Date of Patent: Feb. 6, 2018

(54) BONDING APPARATUS AND METHOD OF FABRICATING CURVED DISPLAY DEVICE USING THE SAME

(71) Applicant: SAMSUNG DISPLAY CO., LTD., Yongin, Gyeonggi-Do (KR)

(72) Inventors: Dong Jin Ok, Hwaseong-si (KR); Katsuhiko Tanaka, Cheonan-si (KR); Soo Chan Lee, Asan-si (KR); Jae Young Kim, Asan-si (KR); Se Mi Lee, Incheon (KR); Jin Suk Lee, Yongin-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 359 days.

(21) Appl. No.: 14/566,980

(22) Filed: Dec. 11, 2014

(65) Prior Publication Data
US 2016/0001536 A1 Jan. 7, 2016

(30) Foreign Application Priority Data
Jul. 2, 2014 (KR) .......................... 10-2014-0082495

(51) Int. Cl.
| | | |
|---|---|---|
| *B32B 37/10* | (2006.01) | |
| *B32B 37/18* | (2006.01) | |
| *B32B 38/04* | (2006.01) | |
| *B32B 38/10* | (2006.01) | |
| *B29C 63/02* | (2006.01) | |
| *H01L 51/56* | (2006.01) | |

(Continued)

(52) U.S. Cl.
CPC .......... *B32B 37/10* (2013.01); *B29C 63/0073* (2013.01); *B32B 37/003* (2013.01); *B32B 37/0046* (2013.01); *G02F 1/1303* (2013.01); *B32B 37/0053* (2013.01); *B32B 37/18* (2013.01); *B32B 38/0004* (2013.01); *B32B 38/1808* (2013.01); *B32B 38/1841* (2013.01); *B32B 38/1866* (2013.01); *B32B 2457/20* (2013.01); *H01L 51/524* (2013.01); *H01L 51/56* (2013.01); *Y10T 156/108* (2015.01); *Y10T 156/1348* (2015.01)

(58) Field of Classification Search
CPC ................................. G02F 1/303; H01L 51/56
USPC ......................................... 156/212, 475, 284
See application file for complete search history.

(56) References Cited

U.S. PATENT DOCUMENTS

2009/0277578 A1* 11/2009 Sung ..................... B32B 37/003
156/285

FOREIGN PATENT DOCUMENTS

| JP | 2004-358856 A | 12/2004 |
|---|---|---|
| JP | 2006-039238 A | 2/2006 |

(Continued)

*Primary Examiner* — Linda L Gray
(74) *Attorney, Agent, or Firm* — Lee & Morse, P.C.

(57) ABSTRACT

A method of fabricating a curved display device includes placing a cover window having a curved portion and a flat portion on a stage, placing an absorption member, on which a panel member is placed, over the stage, and bonding the panel member onto the flat portion and then the curved portion of the cover window by pressing the panel member against the cover window with a roller, wherein a supporting member is formed at an end of the stage, where the bonding of the panel member and the cover window ends, such that the supporting member supports an end of the panel member until the bonding of the panel member and the cover window is complete.

18 Claims, 8 Drawing Sheets

(51) Int. Cl.
*G02F 1/13* (2006.01)
*B29C 63/00* (2006.01)
*B32B 38/00* (2006.01)
*B32B 38/18* (2006.01)
*B32B 37/00* (2006.01)
*H01L 51/52* (2006.01)

(56) References Cited

FOREIGN PATENT DOCUMENTS

| | | |
|---|---|---|
| KR | 10-0557733 B1 | 2/2006 |
| KR | 10-2011-0123987 A | 11/2011 |

\* cited by examiner

BONDING APPARATUS AND METHOD OF FABRICATING CURVED DISPLAY DEVICE USING THE SAME

CROSS-REFERENCE TO RELATED APPLICATION

Korean Patent Application No. 10-2014-0082495, filed on Jul. 2, 2014, in the Korean Intellectual Property Office, and entitled: "Bonding Apparatus and Method of Fabricating Curved Display Device Using the Same," is incorporated by reference herein in its entirety.

BACKGROUND

1. Field

Embodiments relate to a bonding apparatus and a method of fabricating a curved display device using the same.

2. Description of the Related Art

A variety of display devices, e.g., an organic light-emitting diode (OLED) display device and a liquid crystal display (LCD) device, have been employed in the monitors of, e.g., computers, mobile terminals and various other information devices. A typical display device includes a display panel, which displays an image, a cover window, which is bonded onto a surface of the display panel where an image is displayed and protects the display panel, and an adhesive film, which is interposed between the display panel and the cover window and bonds the display panel and the cover window together. The display panel and the cover window may generally be bonded together by a vacuum bonding process or a pressing process involving the use of a roller.

The display devices may also include curved display devices, which are display devices that are at least partially curved and can thus be properly viewed from a variety of angles, have been developed. For example, a curved display device may be fabricated by attaching an adhesive film onto a cover window having a curved portion and a flat portion, with the use of a roller, and then bonding a display panel onto the adhesive film with the use of the roller.

SUMMARY

According to an exemplary embodiment, a bonding apparatus may include a stage on which a cover window having a curved portion and a flat portion place, an absorption member, on which a panel member placed, placed over the stage, a roller bonding the panel member onto the flat portion and then the curved portion of the cover window by pressing the panel member against the cover window, and a supporting member provided at an end of the stage where the bonding of the panel member and the cover window end and supports the end of the panel member until the bonding of the panel member and the cover window is almost complete.

The bonding of the panel member and the cover window may end on the curved portion of the cover window.

The supporting member may be formed in one body with the stage.

The supporting member may be formed on a top surface of the stage as protrusions.

At least one protrusion may be provided as the supporting member.

The panel member may be longer than the cover window before the bonding of the cover window and the panel member, and part of the panel member may be cut off by a cutting member to match the length of the panel member to the length of the cover window after the bonding of the cover window and the panel member.

The supporting member may be a supporting roller that is movable.

The supporting roller may be placed in contact with the cover window until the bonding of the panel member and the cover window is almost complete, and may be separated from the cover window in response to the bonding of the panel member and the cover window being complete.

The panel member may have the same length as the cover window before the bonding of the cover window and the panel member.

The panel member may include at least one of an adhesive film, a touch panel and a display panel.

According to another exemplary embodiment, a method of fabricating a curved display device may include placing a cover window having a curved portion and a flat portion on a stage, placing an absorption member, on which a panel member is placed, over the stage, and bonding the panel member onto the flat portion and then the curved portion of the cover window by pressing the panel member against the cover window with a roller, wherein a supporting member is formed at an end of the stage, where the bonding of the panel member and the cover window ends, such that the supporting member supports an end of the panel member until the bonding of the panel member and the cover window is complete.

The bonding of the panel member and the cover window may end on the curved portion of the cover window.

The supporting member may be formed in one body with the stage.

The supporting member may be formed on a top surface of the stage as protrusions.

At least one protrusion may be provided as the supporting member.

The panel member may be longer than the cover window before the bonding of the cover window and the panel member, and part of the panel member may be cut off by a cutting member to match the length of the panel member to the length of the cover window after the bonding of the cover window and the panel member.

The supporting member may be a supporting roller that is movable.

The supporting roller may be placed in contact with the cover window until the bonding of the panel member and the cover window is almost complete, and may be separated from the cover window in response to the bonding of the panel member and the cover window being complete.

The panel member may have the same length as the cover window before the bonding of the cover window and the panel member.

The panel member may include at least one of an adhesive film, a touch panel and a display panel.

According to yet another exemplary embodiment, a method of fabricating a curved display device may include placing a cover window having a curved portion and a flat portion on a stage, placing an absorption member, on which a panel member is placed, over the stage, such that the panel member faces the cover window, placing a first end of the panel member on a supporting member, the supporting member being at a first end of the stage, and the first end of the stage corresponding to a terminal edge of the curved portion of the cover window, and rolling a roll from a second end of the panel member toward the first end of the panel member, such that the panel member is bonded onto the flat portion and then the curved portion of the cover window by pressing the panel member against the cover window.

The first end of the panel member may be continuously supported on the supporting member until bonding of the panel member to the cover window is complete.

The first end of the panel member may be continuously maintained at a predetermined distance from a terminal edge of the cover window until bonding of the panel member to the cover window is complete.

The supporting member may be spaced apart from the cover window along a surface of the stage, the method further comprising cutting off a portion of the panel member extending beyond a bonded portion of the panel member to the cover window.

The supporting member may be on an edge of the cover window, the method further comprising separating the supporting member.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
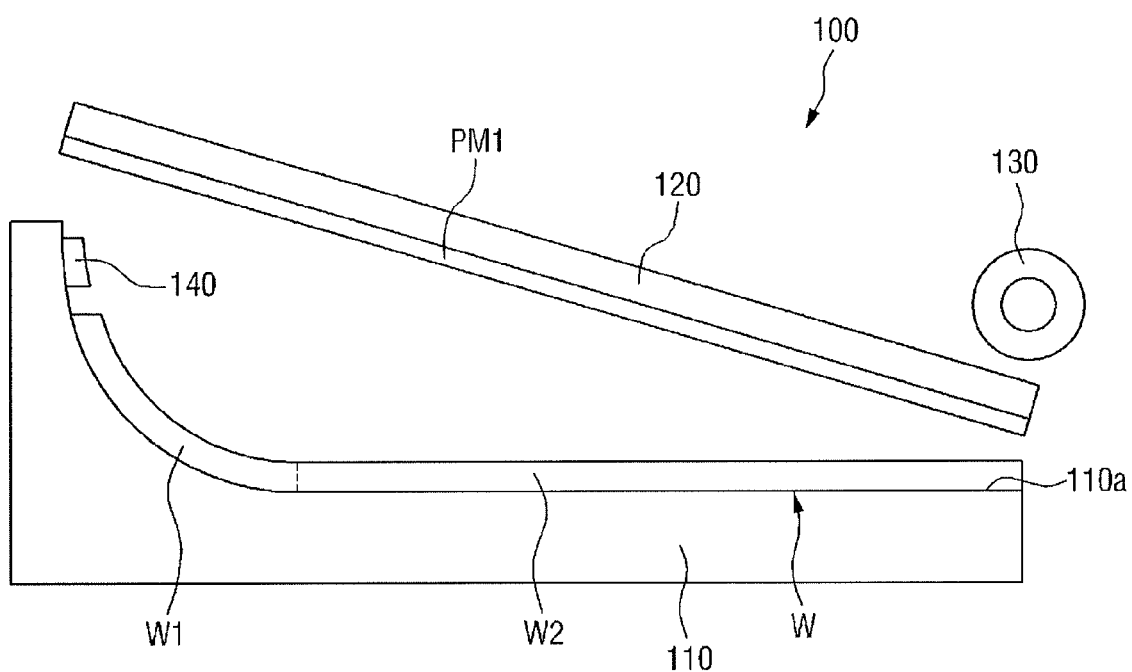
FIG. 1 illustrates a schematic diagram of a bonding apparatus according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the example embodiments.

Exemplary embodiments will hereinafter be described with reference to FIGS. 1-2. FIG. 1 is a diagram illustrating a bonding apparatus according to an exemplary embodiment, and FIG. 2 is a perspective view of a supporting member in FIG. 1.

Figure 2:
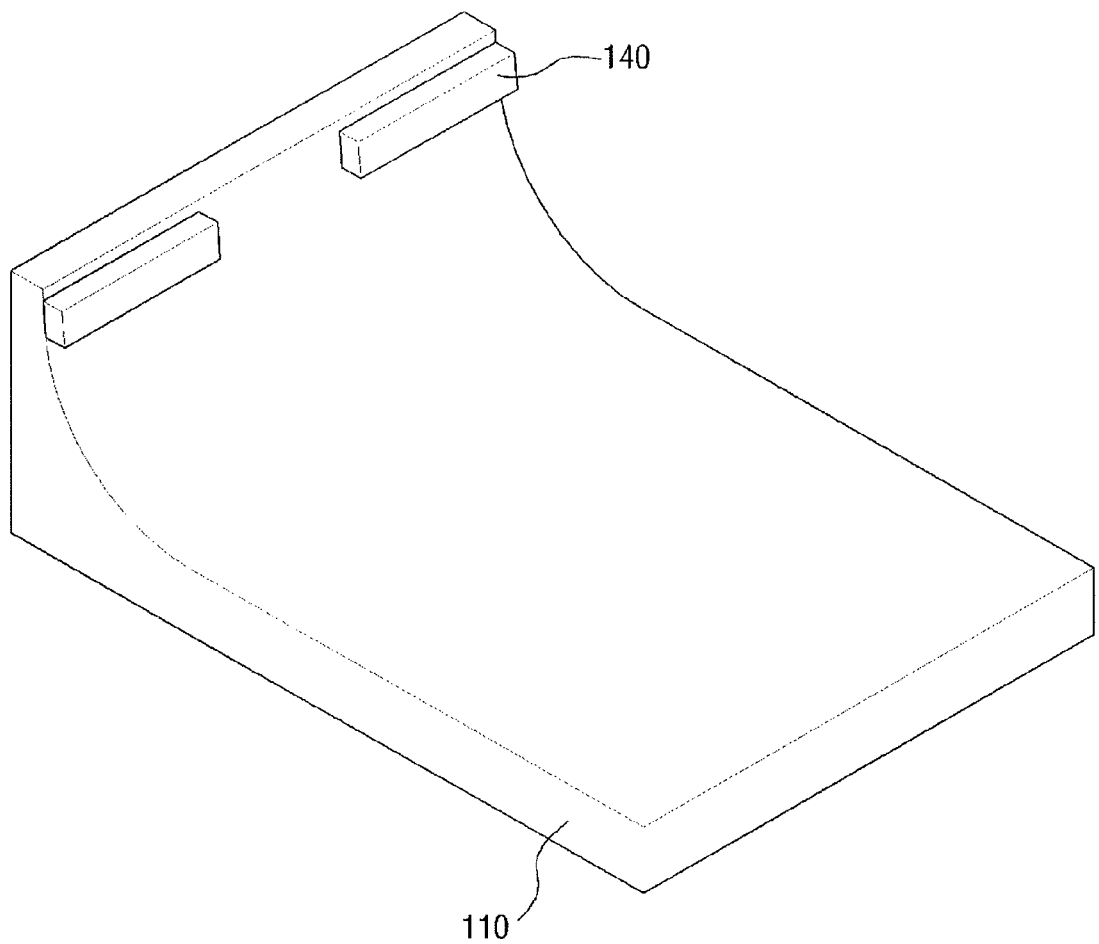
FIG. 2 illustrates a perspective view of a supporting member of the bonding apparatus in FIG. 1.

Referring to FIGS. 1 and 2, a bonding apparatus 100 may include a stage 110, an absorption member 120, a roller 130, and a supporting member 140. The bonding apparatus 100 may be used to bond a panel member PM1 and a cover window W together.

The stage 110 may provide space for accommodating the cover window W thereon, and may include a vacuum absorption hole (not illustrated) for fixing the cover window W by vacuum absorption. A top surface 110a of the stage 110 may have the same shape as the top surface and the bottom surface of the cover window W.

The cover window W may be formed of a rigid material, e.g., glass or plastics. The cover window W may be a panel for use in a display device, e.g., a liquid crystal display (LCD) device, for protecting a display panel, and may have a curved portion W1 formed on at least one side thereof, conforming to the shape of a curved display device. The cover window W is illustrated in FIG. 1 as having the curved portion W1 and a flat portion W2, but embodiments are not limited thereto.

The absorption member 120 may be disposed above the stage 110, and may provide space for accommodating the panel member PM1 thereon. The absorption member 120 may include a vacuum absorption hole (not illustrated) for fixing the panel member PM1 by vacuum absorption. A driving unit (not illustrated), e.g., a motor, may be connected to the absorption member 120 for vertically or horizontally moving the absorption member 120 during the bonding of the panel member PM1 and the cover window W.

The panel member PM1 may be at least one of an adhesive film, e.g., an optical clear adhesive (OCA) tape, a touch panel, and a display panel. The touch panel and the display panel may be formed of a soft material, e.g., a flexible plastic material. In the exemplary embodiment of FIG. 1, the panel member PM1 may be an adhesive film.

The roller 130 presses the panel member PM1, e.g., via the absorption member 120, against the cover window W, such that the panel member PM1 can be attached onto the flat portion W2 of the cover window W, and then to the curved portion W1 of the cover window W. A driving unit (not illustrated), e.g., a motor, for moving the roller 130 may be connected to the roller 130, such that the roller 130 can press the panel member PM1 against the flat portion W2 and then against the curved portion W1 of the cover window W.

The supporting member 140 may be fixed at a first end of the stage 110, i.e., an end where the bonding of the panel member PM1 and the cover window W ends. As illustrated in FIG. 1, the supporting member 140 may be fixed onto the stage 110 beyond an edge of the cover window W, e.g., the supporting member 140 may be spaced apart from an edge of the cover window W, to prevent interference, e.g., overlap, between the supporting member 140 and the cover window W. The supporting member 140 may be formed on, e.g., directly on, the top surface 110a of the stage 110 as a protrusion. The supporting member 140 may be formed as one body with the stage 110, e.g., formed of a same material as the stage 110 to define a single and seamless structure, or may be formed of a material different from that of the stage 110.

As illustrated in FIG. 2, at least one supporting member 140, e.g., two supporting members 140 spaced apart from each other, may be formed on the stage 110. For example, the supporting member 140 may have a linear shape extending along a direction perpendicular to a direction in which the bonding of the panel member PM1 and the cover window W proceeds, i.e., a direction in which the roller 130 moves.

The supporting member 140 may support the panel member PM1 until the bonding of the panel member PM1 and the cover window W is complete. In detail, in a case in which the panel member PM1 is bonded onto the flat portion W2 and then the curved portion W1 of the cover window W with the use of the roller 130, the supporting member 140 may prevent the end of the panel member PM1 from meeting the end of the curved portion W1 of the cover window W until the bonding of the panel member PM1 and the cover window W is almost complete. That is, while the roller 130 attaches the panel member PM1 sequentially to the flat portion W2 and to the curved portion W1 of the cover window W, the supporting member 140 supports an end of the panel member PM1 at a predetermined distance from the curved portion W1 of the cover window W to prevent contact therebetween until the bonding of the panel member PM1 and the cover window W is complete, as will be discussed in more detail below with reference to FIGS. 3-6.

Accordingly, the supporting member 140 may prevent bubbles from being created between the panel member PM1 and the cover window W. In contrast, in a bonding apparatus without the supporting member 140, the second end of the panel member PM1 may contact an end of the curved portion W1 of the cover window W before the bonding of the panel member PM1 to the flat portion W2 of the cover window W is complete, thereby causing non-uniform bonding and creation of bubbles between the panel member PM1 and the cover window W.

In a case in which the supporting member 140 is fixed onto the top surface 110a of the stage 110, the panel member PM1 is longer than the cover window W in order to be properly supported by the supporting member 140 during the bonding of the panel member PM1 and the cover window W. Further, when the panel member PM1 is longer than the cover window W, a process of matching the length of the panel member PM1 to the length of the cover window W may be needed after bonding of the panel member PM1 and the cover window W. Accordingly, a cutting member (not illustrated), e.g., a laser, may be needed to cut the panel member PM1. The bonding apparatus 100 may further include a control unit (not illustrated), which controls the driving units and cutting member of the bonding apparatus 100.

Since the bonding apparatus 100 has the supporting member 140 at the end of the stage 110, e.g., above a point where the bonding of the panel member PM1 and the cover window W ends, the bonding apparatus 100 may support the panel member PM1 until the bonding of the panel member PM1 and the cover window W is, e.g., almost, complete. Accordingly, the bonding apparatus 100 may prevent bubbles from being created between the panel member PM1 and the cover window W, e.g., which may be potentially caused by the end of the panel member PM1 meeting the end of the curved portion W1 of the cover window W before the bonding of the panel member PM1 and the cover window W is complete. As a result, a curved display device with an improved quality of display may be realized.

A method of fabricating a curved display device using the bonding apparatus 100 will be described hereinafter with reference to FIGS. 3-6. FIGS. 3 to 6 are diagrams illustrating stages in a method of fabricating a curved display device with the bonding apparatus 100 according to an exemplary embodiment.

Figure 3:
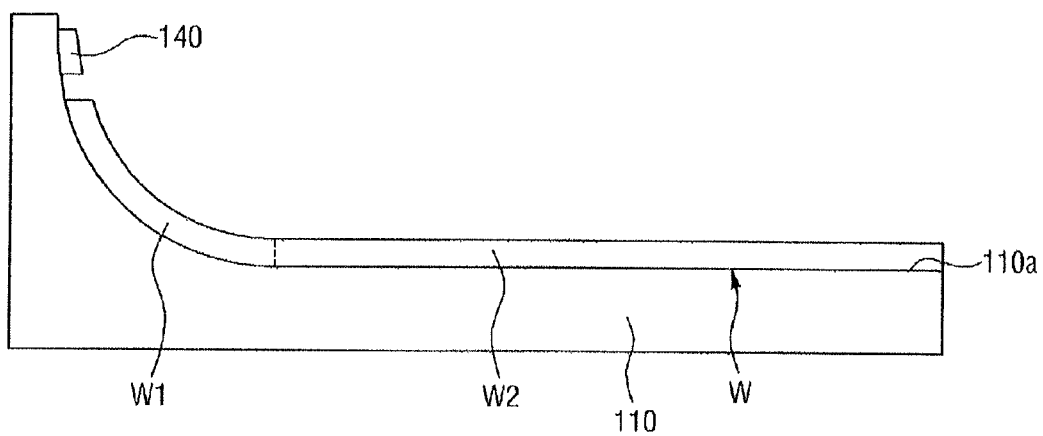
FIGS. 3 to 6 illustrate schematic diagrams of stages in a method of fabricating a curved display device according to an exemplary embodiment.

Referring to FIG. 3, the cover window W, which includes the curved portion W1 and the flat portion W2, may be placed on the stage 110. The curved portion W1 and the flat portion W2 are continuous with each other.

Figure 4:
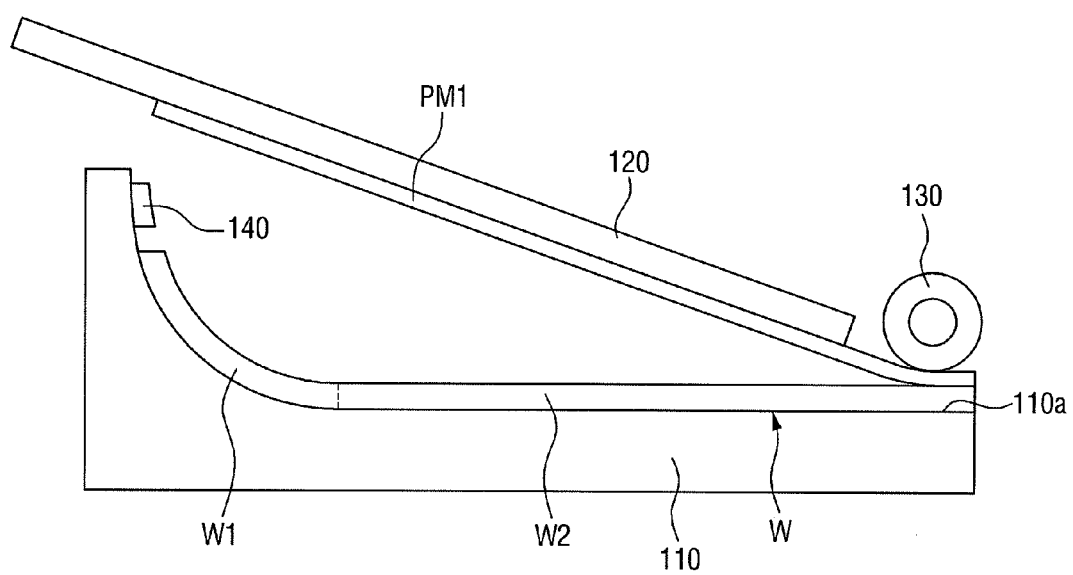

Referring to FIG. 4, the absorption member 120 with the panel member PM1 may be positioned above the stage 110, such that the panel member PM1 may face the cover window W on the stage 110. The panel member PM1 may be longer than the cover window W, and a first end of the panel member PM1 may be attached to an end of the flat portion W2 of the cover window W by the roller 130. The roller 130 may move along a horizontal direction while pressing the panel member PM1 against the cover window W, so that the panel member PM1 may be bonded to the flat portion W2 of the cover window W.

Figure 5:
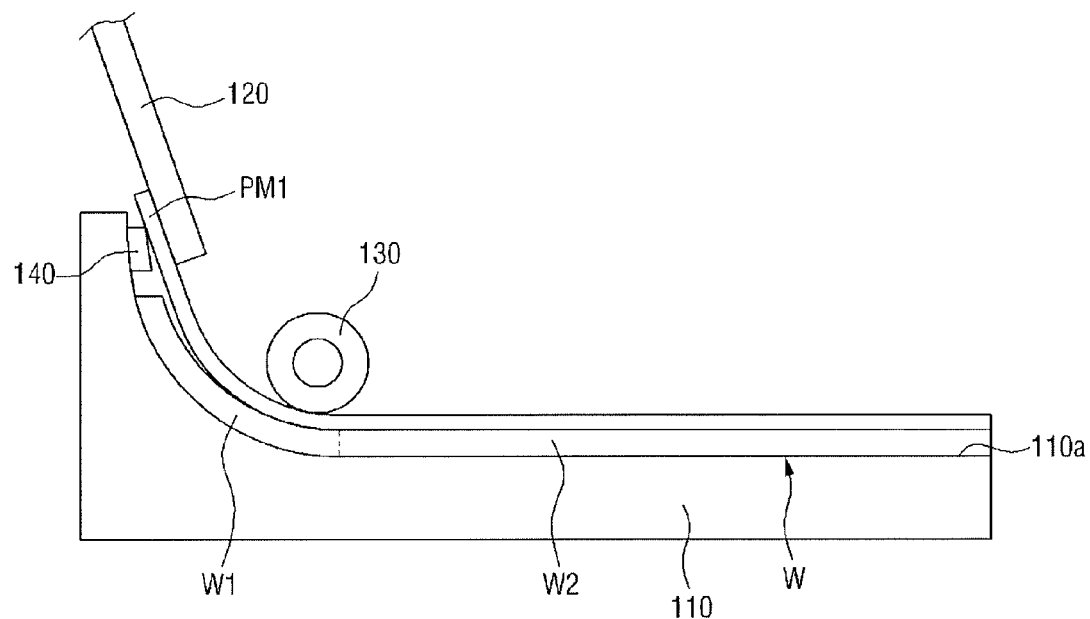

As illustrated in FIG. 5, the supporting member 140, which is disposed at the end of the stage 110 where the bonding of the panel member PM1 and the cover window W ends, supports the end of the panel member PM1. That is, while the roller 130 rolls and presses the panel member PM1 against the curved portion W1 of the cover window W, the supporting member 140 causes a portion of the panel member PM1 directly corresponding to the edge of the cover window W to be spaced apart therefrom. As a result, the end of the panel member PM1 may be prevented from meeting the end of the curved portion W1 of the cover window W until the bonding of the panel member PM1 and the cover window W is complete. As such, the end of the panel member PM1 and the end of the curved portion W1 of the cover window W do not contact each other before the bonding of the panel member PM1 and the cover window W is complete. Therefore, bubbles may be prevented from being created between the panel member PM1 and the cover window W, e.g., caused by potential contact between the end of the panel member PM1 and the end of the curved portion W1 of the cover window W before bonding of the panel member PM1 and the cover window W is complete.

Figure 6:
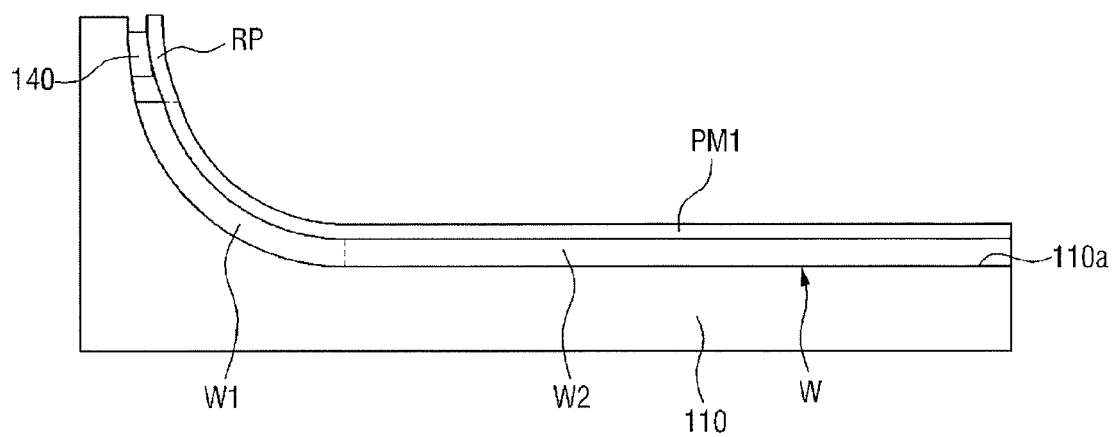

Referring to FIG. 6, once the bonding of the panel member PM1 and the cover window W is complete, part RP of the panel member PM1 may remain unbonded with the cover window W due to the length difference between the panel member PM1 and the cover window W. To match the length of the panel member PM1 to the length of the cover window W, the part RP of the panel member PM1 may be removed by using a cutting device.

Figure 7:
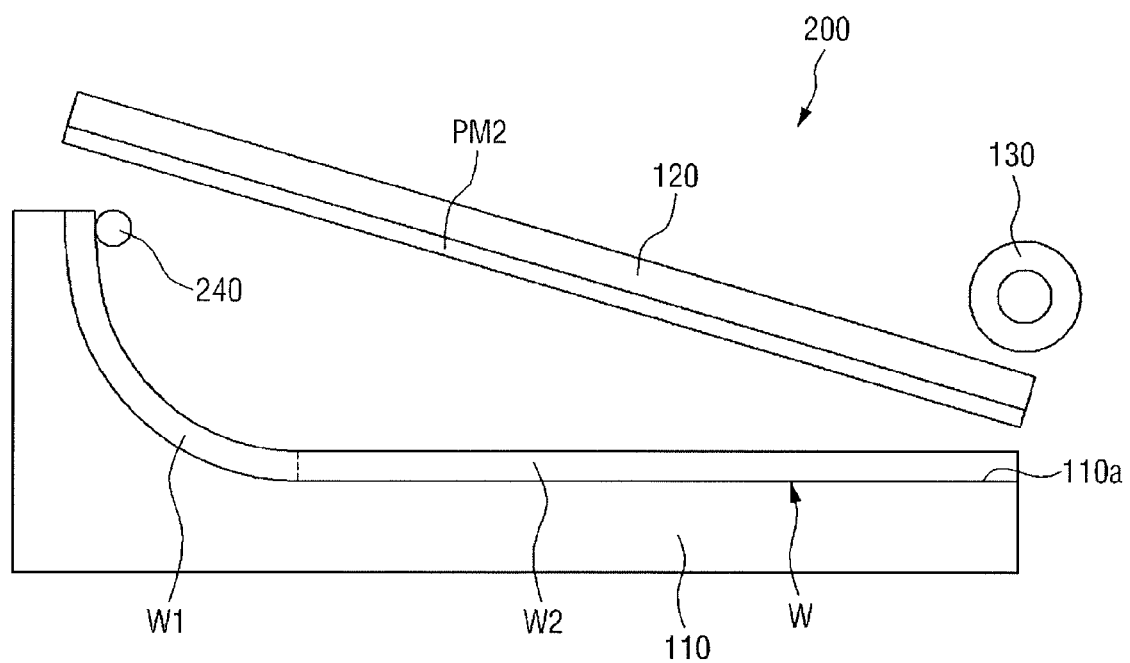
FIG. 7 illustrates a schematic diagram of a bonding apparatus according to another exemplary embodiment.

A bonding apparatus 200 according to another exemplary embodiment will be described hereinafter with reference to FIGS. 7-8. The bonding apparatus 200 is substantially the same as the bonding apparatus 100 of FIG. 1, except for a supporting member 240 thereof, and therefore, the description hereinafter will be focusing mainly on the supporting member 240. FIG. 7 is a diagram illustrating the bonding apparatus 200, and FIG. 8 is a perspective view of the supporting member 240.

Figure 8:
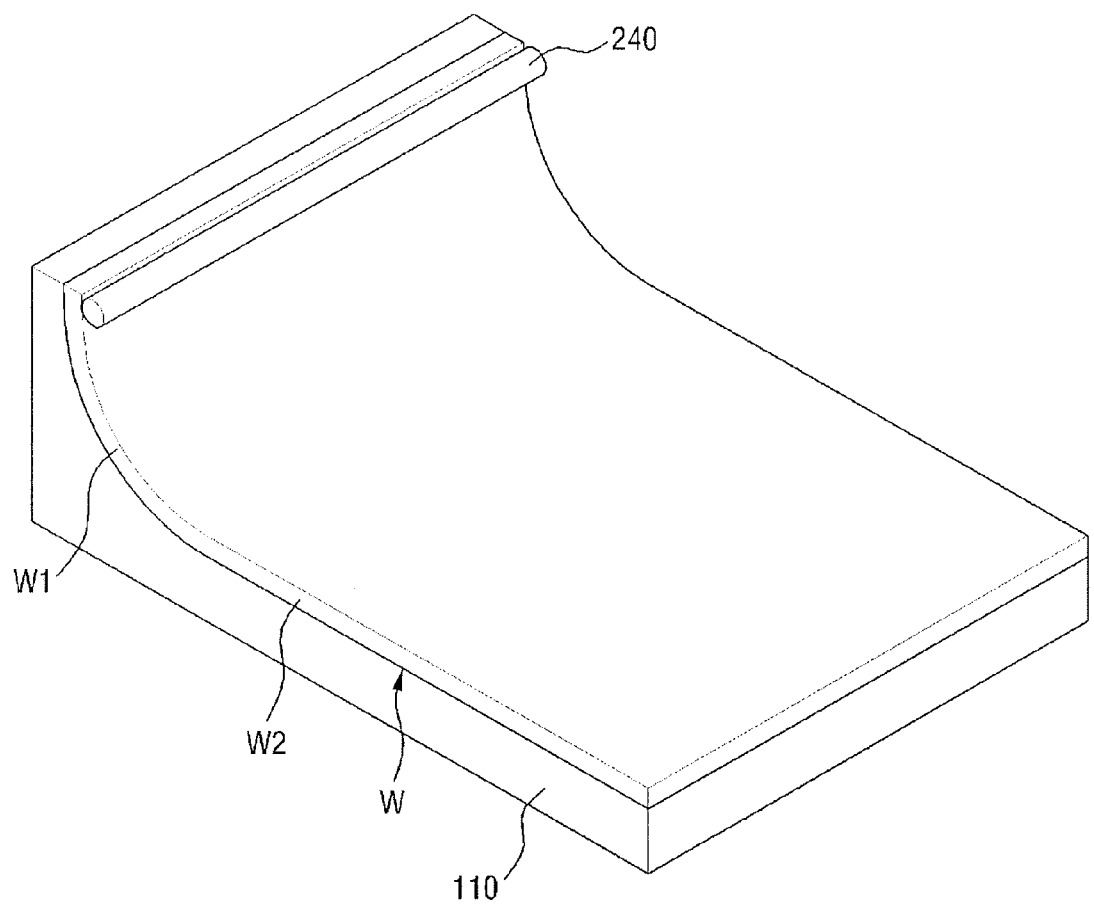
FIG. 8 illustrates a perspective view of a supporting member of the bonding apparatus in FIG. 7.

Referring to FIGS. 7 and 8, the bonding apparatus 200 may include the stage 110, the absorption member 120, the roller 130, and the supporting member 240. The bonding apparatus 200 may be used to bond a panel member PM2 and the cover window W.

The supporting member 240 may be provided at an end of the stage 110 where the bonding of the panel member PM2 and the cover window W ends, and particularly, at the end of the curved portion W1 of the cover window W, which is placed on the stage 110. For example, as illustrated in FIGS.

7-8, the supporting member 240 may be on the curved portion W1 of the cover window W, e.g., so the curved portion W1 may be between the stage 110 and the supporting member 240. The supporting member 240 may be movable, e.g., the supporting member 240 may be a supporting roller. The supporting member 240 may be formed to extend along a direction perpendicular to a direction in which the bonding of the panel member PM2 and the cover window proceeds, i.e., a direction in which the roller 130 moves.

The supporting member 240 may be placed in contact with the end of the curved portion W1 of the cover window W so as to support the panel member PM2 until the bonding of the panel member PM2 and the cover window W is, e.g., almost, complete, and may be separated from the cover window W in response to the bonding of the panel member PM2 and the cover window W being complete. In a case in which the panel member PM2 is bonded onto a flat portion W2 and then the curved portion W1 of the cover window W by using the roller 130, the supporting member 240 may prevent the end of the panel member PM2 from meeting the end of the curved portion W1 ahead of time before the bonding of the panel member PM2 and the cover window W is complete. Accordingly, the supporting member 240 may prevent bubbles from being created between the panel member PM2 and the cover window W as a result of the end of the panel member PM2 meeting the end of the curved portion W1 of the cover window W before the bonding of the panel member PM2 and the cover window W is complete.

As a result of the supporting member 240 being movably provided at the end of the stage 110, the supporting member 240 may properly support the end of the panel member PM2 until the bonding of the panel member PM2 and the cover window W is complete, as will be described in more detail below with reference to FIGS. 9-12. Thus, the panel member PM2 may be formed to have the same length as the cover window W. Accordingly, no cutting member is needed to cut off part of the panel member PM2 that remains unbounded to the cover window W.

A driving unit (not illustrated) for moving the supporting member 240 may be connected to the supporting member 240. The bonding apparatus 200 may also include a control unit (not illustrated), which controls the driving units of the bonding apparatus 200.

Since the bonding apparatus 200 has the supporting member 240 at the end of the stage 110 where the bonding of the panel member PM2 and the cover window W ends, the bonding apparatus 200 may support the panel member PM2 until the bonding of the panel member PM2 and the cover window W is, e.g., almost, complete. Accordingly, the bonding apparatus 200 may prevent bubbles from being created between the panel member PM2 and the cover window W, e.g., caused by the end of the panel member PM2 meeting the end of the curved portion W1 of the cover window W before the bonding of the panel member PM2 and the cover window W is complete, and as a result, a curved display device with an improved quality of display may be realized.

A method of fabricating a curved display device using the bonding apparatus 200 will be described hereinafter with reference to FIGS. 9-12. FIGS. 9 to 12 are diagrams illustrating stages in a method of fabricating a curved display device according to another exemplary embodiment via the bonding apparatus 200.

Figure 9:
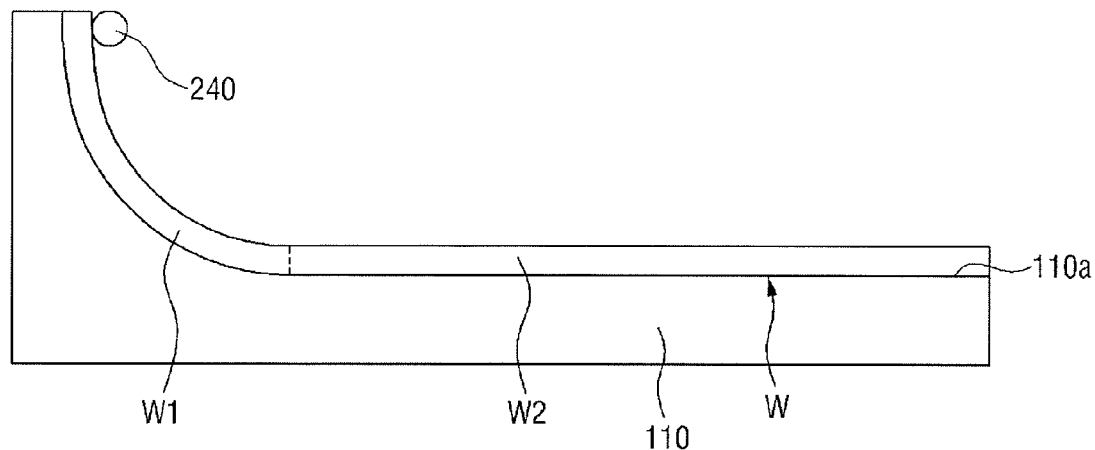
FIGS. 9 to 12 illustrate schematic diagrams of stages in a method of fabricating a curved display device according to another exemplary embodiment.

Referring to FIG. 9, the cover window W, having the curved portion W1 and the flat portion W2, may be placed on the stage 110. Further, the supporting member 240 may be positioned on an uppermost edge of the curved portion W1 of the cover window W.

Figure 10:
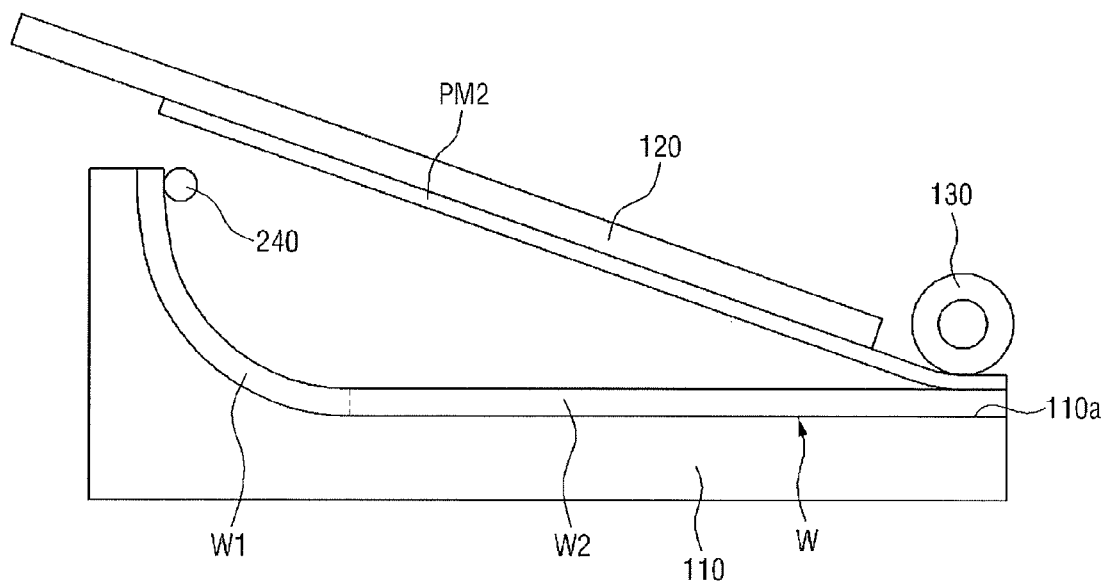

Referring to FIG. 10, the absorption member 120 with the panel member PM2, which has the same length as the cover window W, may be placed over the stage 110. The panel member PM2 may be pressed against the cover window W with the roller 130, so that the panel member PM2 may be bonded to the flat portion W2 and then the curved portion W1 of the cover window W.

Figure 11:
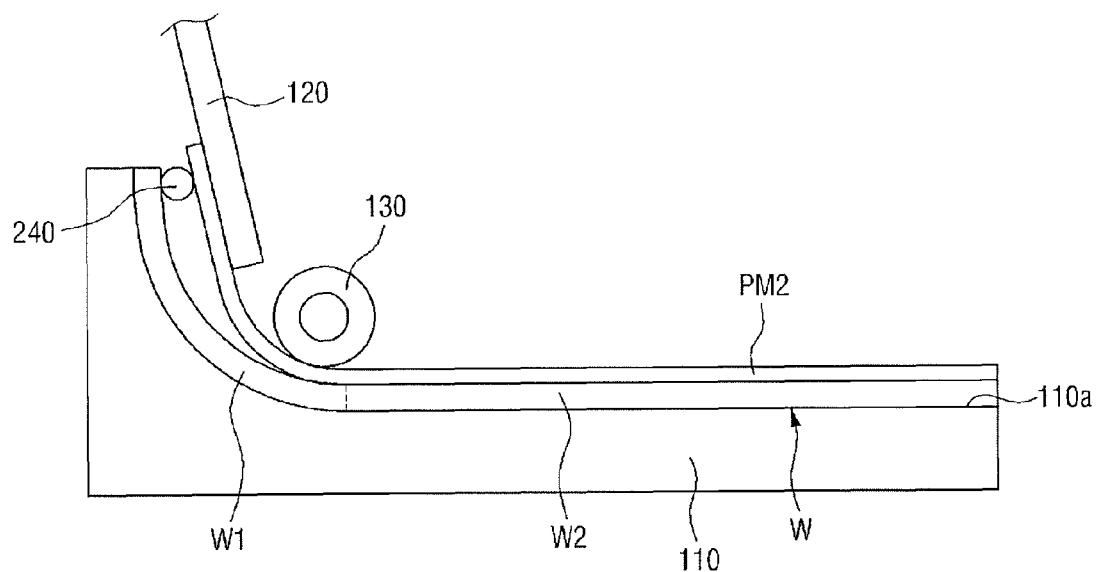

As illustrated in FIG. 11, the supporting member 240, which is disposed at the end of the stage 110 where the bonding of the panel member PM2 and the cover window W ends, supports the end of the panel member PM2 until the bonding of the panel member PM2 and the cover window W is almost complete, e.g., until the bonding of the panel member PM2 and the cover window W is complete with the exception of the ends thereof overlapped by the supporting member 240. As a result, the end of the panel member PM2 may be prevented from meeting the end of the curved portion W1 of the cover window W before the bonding of the panel member PM2 and the cover window W is almost complete. Therefore, bubbles may be prevented from being created between the panel member PM2 and the cover window W, e.g., generated by the end of the panel member PM2 meeting the end of the curved portion W1 of the cover window W before the bonding of the panel member PM2 and the cover window W is complete.

Figure 12:
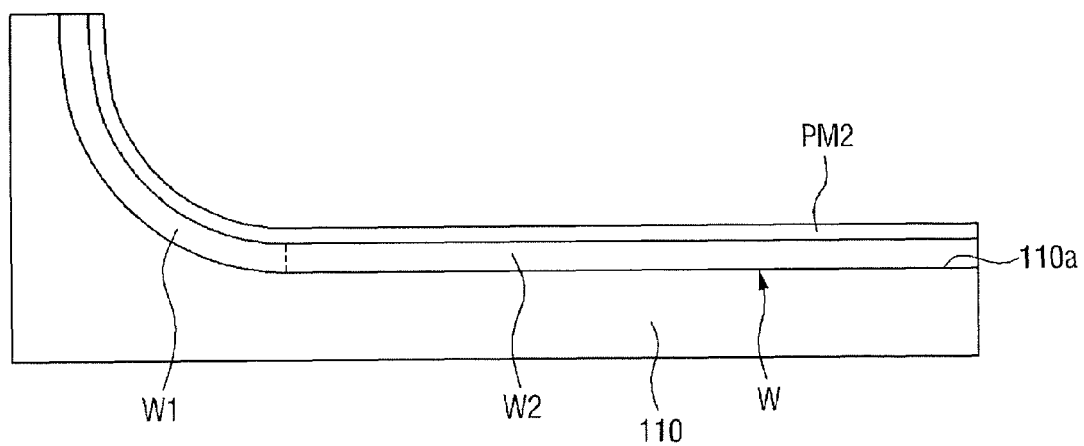

Referring to FIG. 12, once the bonding of the panel member PM2 and the cover window W is complete, the supporting member 240 may be separated from the cover window W.

By way of summation and review, exemplary embodiments provide a bonding apparatus and a method of fabricating a curved display device using the same, which can prevent bubbles from being created in a curved display device, thereby improving the quality of display of the curved display device. That is, according to the exemplary embodiments, a bonding apparatus has a supporting member at an end of a stage where the bonding of a panel member and a cover window ends. As such, the supporting member supports an edge of the panel member until the bonding of the panel member and the cover window is almost complete. Accordingly, the bonding apparatus can prevent bubbles from being created between the panel member and the cover window, e.g., caused by an end of the panel member meeting an end of the curved portion of the cover window before the bonding of the panel member and the cover window is complete, thereby realizing a curved display device with an improved display quality.

In contrast, in a case of bonding an adhesive film onto a flat portion and then a curved portion of a cover window with a conventional apparatus, i.e., without the supporting member according to embodiments, the end of the adhesive film may meet the end of the curved portion of the cover window ahead of time during attachment of the adhesive film onto the cover window. In this case, bubbles may be created between the cover window and the adhesive film. Also, in a case of bonding the display panel onto the flat portion and then the curved portion of the adhesive film with the use of the roller, the end of the display panel can meet with the end of the curved portion of the adhesive film ahead of time during attachment of the display panel onto the adhesive film. In this case, bubbles may be created between the adhesive film and the display panel. Such bubbles may result in smudges on a curved display device and may, thus, degrade the quality of display of the curved display device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of fabricating a curved display device, the method comprising:
    placing a cover window having a curved portion and a flat portion on a stage;
    placing an absorption member, on which a panel member is placed, over the stage; and
    bonding the panel member onto the flat portion and then the curved portion of the cover window by pressing the panel member against the cover window with a roller,
    wherein a supporting member is formed at an end of the stage and on a same surface of the stage as the cover window, where the bonding of the panel member and the cover window ends, such that the supporting member supports an end of the panel member until the bonding of the panel member and the cover window is complete.

2. The method as claimed in claim 1, wherein the bonding of the panel member and the cover window ends at an end of the curved portion of the cover window.

3. The method as claimed in claim 1, wherein the supporting member is formed in one body with the stage.

4. The method as claimed in claim 1, wherein the supporting member is formed on a top surface of the stage as at least one protrusion.

5. The method as claimed in claim 4, wherein at least two protrusions spaced apart from each other horizontally are provided as the supporting member.

6. The method as claimed in claim 4, wherein, before bonding the cover window and the panel member, the panel member is longer than the cover window, and the method further comprises cutting a part of the panel member to match a length of the panel member to a length of the cover window after bonding the cover window and the panel member.

7. The method as claimed in claim 1, wherein the supporting member is formed as a movable supporting roller.

8. The method as claimed in claim 7, wherein the supporting roller maintains contact with the cover window until the bonding of the panel member and the cover window is almost complete, and the supporting roller is separated from the cover window when the bonding of the panel member and the cover window is complete.

9. The method as claimed in claim 7, wherein, before bonding the cover window and the panel member, the panel member has a same length as the cover window.

10. The method as claimed in claim 1, wherein the panel member is at least one of an adhesive film, a touch panel, and a display panel.

11. The method as claimed in claim 1, wherein the cover window includes a curved portion at a single edge of a flat portion, the flat portion being longer than the curved portion.

12. The method as claimed in claim 1, wherein the stage includes a first flat portion, a second flat portion, and a curved portion connecting the first and second flat portions, the first flat portion being longer than the curved portion, and the supporting member being on the second flat portion.

13. The method as claimed in claim 1, wherein the supporting member and the cover window are directly on a top surface of the stage, and a portion of the top surface of the stage being exposed between the supporting member and the cover window.

14. A method of fabricating a curved display device, the method comprising:
    placing a cover window having a curved portion and a flat portion on a stage;
    placing an absorption member, on which a panel member is placed, over the stage, such that the panel member faces the cover window;
    placing a first end of the panel member on a supporting member, the supporting member being at a first end of the stage and on a same surface of the stage as the cover window, and the first end of the stage corresponding to a terminal edge of the curved portion of the cover window; and
    rolling a roll from a second end of the panel member toward the first end of the panel member, such that the panel member is bonded onto the flat portion and then the curved portion of the cover window by pressing the panel member against the cover window.

15. The method as claimed in claim 14, wherein the first end of the panel member is continuously supported on the supporting member until bonding of the panel member to the cover window is complete.

16. The Method as claimed in claim 15, wherein the first end of the panel member is continuously maintained at a predetermined distance from a terminal edge of the cover window until bonding of the panel member to the cover window is complete.

17. The method as claimed in claim 16, wherein the supporting member is spaced apart from the cover window along a surface of the stage, the method further comprising cutting off a portion of the panel member extending beyond a bonded portion of the panel member to the cover window.

18. The method as claimed in claim 16, wherein the supporting member is on an edge of the cover window, the method further comprising separating the supporting member.

* * * * *